United States Patent
Mylet et al.

(10) Patent No.: US 8,086,519 B2
(45) Date of Patent: Dec. 27, 2011

(54) SYSTEM AND METHOD FOR FACILITATING A WIRELESS FINANCIAL TRANSACTION

(75) Inventors: Darrin Michael Mylet, Tampa, FL (US); Lee M. Amaitis, London (GB); Alan Brent Wilkins, Raleigh, NC (US)

(73) Assignee: CFPH, LLC, New York, NY (US)

( * ) Notice: Subject to any disclaimer, the term of this patent is extended or adjusted under 35 U.S.C. 154(b) by 1740 days.

(21) Appl. No.: 10/965,582

(22) Filed: Oct. 14, 2004

(65) Prior Publication Data

US 2006/0085310 A1   Apr. 20, 2006

(51) Int. Cl.
*G06Q 40/00* (2006.01)

(52) U.S. Cl. ........................................................ 705/37

(58) Field of Classification Search .................... None
See application file for complete search history.

(56) References Cited

U.S. PATENT DOCUMENTS

| | | | |
|---|---|---|---|
| 3,976,840 A | 8/1976 | Cleveland et al. | 179/2 DP |
| 4,980,826 A | 12/1990 | Wagner | 364/408 |
| 5,038,284 A | 8/1991 | Kramer | 364/408 |
| 5,315,634 A | 5/1994 | Tanaka et al. | 379/57 |
| 5,793,301 A | 8/1998 | Patterson, Jr. et al. | 340/825.26 |
| 5,796,832 A | 8/1998 | Kawan | 380/24 |
| 5,797,002 A | 8/1998 | Patterson, Jr. et al. | 395/611 |
| 6,144,367 A * | 11/2000 | Berstis | 345/158 |
| 6,442,532 B1 | 8/2002 | Kawan | 705/35 |
| 6,462,671 B2 | 10/2002 | Bushner et al. | 340/825.27 |
| 6,505,175 B1 | 1/2003 | Silverman et al. | 705/37 |
| 6,539,362 B1 | 3/2003 | Patterson, Jr. et al. | 705/35 |
| 6,556,819 B2 | 4/2003 | Irvin | 455/410 |
| 6,625,583 B1 | 9/2003 | Silverman et al. | 705/36 |
| 6,721,652 B1 | 4/2004 | Sanqunetti | |
| 6,765,470 B2 | 7/2004 | Shinzaki | 340/5.52 |
| 6,768,981 B2 | 7/2004 | Patterson, Jr. et al. | 705/36 |
| 6,778,837 B2 * | 8/2004 | Bade et al. | 455/456.1 |
| 6,785,551 B1 * | 8/2004 | Richard | 455/456.1 |
| 6,846,238 B2 * | 1/2005 | Wells | 463/39 |
| 6,950,946 B1 | 9/2005 | Droz et al. | 713/201 |
| 7,013,128 B2 * | 3/2006 | Ozeki et al. | 455/411 |
| 7,035,626 B1 * | 4/2006 | Luciano, Jr. | 455/414.1 |
| 7,046,643 B1 * | 5/2006 | Zellner et al. | 370/329 |
| 7,058,601 B1 | 6/2006 | Paiz | |

(Continued)

FOREIGN PATENT DOCUMENTS

JP   2000 113092   4/2000

(Continued)

OTHER PUBLICATIONS

Anonymous; Mobile Gambling to Take Off; Europemedia; May 17, 2002.*

(Continued)

*Primary Examiner* — Alexander Kalinowski
*Assistant Examiner* — Virpi Kanervo
(74) *Attorney, Agent, or Firm* — Glen R. Farbanish

(57) ABSTRACT

A method for executing a wireless trade is provided that includes communicating with a handheld device via a wireless network and sending and receiving financial information to and from the handheld device. The financial information is associated with a trade that can be initiated by the handheld device. The method also includes authorizing the handheld device through location data, which is associated with a location of the handheld device, before executing the trade.

76 Claims, 5 Drawing Sheets

U.S. PATENT DOCUMENTS

| | | | |
|---|---|---|---|
| 7,096,003 B2 | 8/2006 | Joao et al. ..................... 455/406 |
| 7,107,240 B1 | 9/2006 | Silverman et al. .............. 705/37 |
| 7,236,952 B1* | 6/2007 | D'Zmura .................... 705/36 R |
| 2001/0034237 A1* | 10/2001 | Garahi ........................ 455/456 |
| 2001/0037254 A1 | 11/2001 | Glikman ........................ 705/26 |
| 2001/0051920 A1 | 12/2001 | Joao et al. ....................... 705/41 |
| 2001/0056402 A1 | 12/2001 | Ahuja et al. .................... 705/43 |
| 2002/0002075 A1 | 1/2002 | Rowe |
| 2002/0019223 A1 | 2/2002 | Lee et al. ...................... 455/411 |
| 2002/0023215 A1 | 2/2002 | Wang et al. |
| 2002/0049714 A1 | 4/2002 | Yamazaki et al. ................ 707/1 |
| 2002/0104012 A1* | 8/2002 | Xydis .......................... 713/200 |
| 2002/0120536 A1 | 8/2002 | Maung et al. ................... 705/35 |
| 2002/0120571 A1* | 8/2002 | Maung et al. ................... 705/42 |
| 2002/0123971 A1 | 9/2002 | Maritzen et al. ................ 705/64 |
| 2002/0147049 A1* | 10/2002 | Carter, Sr. ........................ 463/42 |
| 2002/0169685 A1 | 11/2002 | Joao ............................... 705/26 |
| 2002/0169706 A1 | 11/2002 | Chandra et al. |
| 2002/0174055 A1 | 11/2002 | Dick et al. ....................... 705/37 |
| 2003/0004891 A1 | 1/2003 | Van Rensburg et al. ........ 705/64 |
| 2003/0006931 A1* | 1/2003 | Mages ..................... 342/357.06 |
| 2003/0031321 A1* | 2/2003 | Mages ........................... 380/270 |
| 2003/0064807 A1 | 4/2003 | Walker et al. |
| 2003/0087701 A1 | 5/2003 | Paravia |
| 2003/0097350 A1* | 5/2003 | ShamRao ......................... 707/1 |
| 2003/0144057 A1 | 7/2003 | Brenner et al. |
| 2004/0034591 A1 | 2/2004 | Waelbroeck et al. ........... 705/37 |
| 2004/0106372 A1* | 6/2004 | Andersson et al. .......... 455/3.02 |
| 2004/0107144 A1 | 6/2004 | Short .............................. 705/26 |
| 2004/0111360 A1 | 6/2004 | Albanese ........................ 705/38 |
| 2004/0235563 A1* | 11/2004 | Blackburn et al. .............. 463/29 |
| 2005/0075958 A1 | 4/2005 | Gonzalez ........................ 705/35 |
| 2005/0128304 A1* | 6/2005 | Manasseh et al. ........ 348/207.99 |
| 2005/0171893 A1 | 8/2005 | Gaer .............................. 705/37 |
| 2005/0186954 A1 | 8/2005 | Kenney ......................... 455/420 |
| 2005/0187020 A1* | 8/2005 | Amaitis et al. .................. 463/42 |
| 2005/0277428 A1 | 12/2005 | Brown ...................... 455/456.3 |
| 2006/0041746 A1* | 2/2006 | Kirkup et al. ................. 713/168 |
| 2006/0053480 A1* | 3/2006 | Lacasse et al. ..................... 726/2 |
| 2006/0100951 A1 | 5/2006 | Mylet et al. ..................... 705/37 |
| 2006/0149659 A1 | 7/2006 | Carone et al. ................... 705/37 |
| 2006/0200356 A1 | 9/2006 | Wan |
| 2007/0105548 A1 | 5/2007 | Mohan et al. |

FOREIGN PATENT DOCUMENTS

| | | |
|---|---|---|
| JP | 2003-22255 | 1/2003 |
| JP | 2004-240645 | 8/2004 |
| KR | 2005 087587 | 8/2005 |
| WO | WO 98/57518 | 12/1998 |
| WO | WO 2004/017611 A2 | 2/2004 |
| WO | WO 2005/020208 A2 | 3/2005 |

OTHER PUBLICATIONS

Anonymous; Location Technology Assists Gaming; Wireless Week; Jul. 12, 1999; p. 18.*

Anonymous; Banks Pondering the Power of New Internet Gadgets; Bank Technology News; Feb. 1999.*

Trombly, Maria; Evolving Standard May Boost Wireless; Security Industry News; Jun. 7, 2004.*

*Notification of Transmittal of the International Search Report and the Written Opinion of the International Searching Authority, or the Declaration* for International Application No. PCT/US05/40417; 7 pages, Feb. 6, 2007.

*United States Patent and Trademark Office; Office Action* for U.S. Appl. No. 10/984,300, filed Nov. 8, 2004 in the name of Darrin Michael Mylet; 24 pages, Apr. 10, 2008.

Notification of Transmittal of the International Search Report and the Written Opinion of the International Searching Authority, or the Declaration for International Application No. PCT/US05/36694, 6 pages, Aug. 31, 2006.

S. Nylander, M. Bylund, and M. Boman, "Mobile access to real-time information—the case of autonomous stock brokering," NDN-259-0804-1750-6, ISSN-1617-4909, 1 pg, 2004.

I. Schmerken, "The Big Board pushes wireless to end the paper trail ÝNew York Stock Exchange," NDN-174-0684-4851-6, ISSN-1060-989X, 1 pg, 2001.

B. Foster, "Stock trading goes mobile," NDN-174-0675-0799-9, ISSN-0010-3632, 1 pg, 2000.

K. Cavanaugh, "You can take it with you Ýwireless trading service," NDN-174-0616-7017-3, ISSN-1060-989X, 1 pg, 1999.

M.N. Duffy, "The market moves—do you?" NDN-174-0601-5281-9, ISSN-1060-989X, 1 pg, 1998.

Author unknown, "One platform for trading," NDN-174-0585-2141-3, ISSN 0010-3632, 1 pg, 1998.

USPTO Office Action for U.S. Appl. No. 10/984,300 ; 16 pages; Dec. 17, 2008.

Robin O'Kelly, "Major New Players Jon effort to Finalize Open Standards for Internet Commerce", SOURCE: Mondex International, CA, San Francisco, Jun. 24, 1997.

Notice of Allowance for U.S. Appl. No. 10/984,300; 8 pages; dated Feb. 24, 2010.

U.S. Appl. No. 11/557,131 filed Nov. 7, 2006; 40 pages; Sep. 29, 2009.

Goldsleger, "ORGA sets its course for Growth'" SOURCE: Orga Card Systems, Inc.. Paderborn, Germany, Jul. 26, 1998.

Robin O'Kelly, "Major New Players Jon effort to Finalize Open Standards for Internet Commerce", SOURCE: Mondex International, CA, San Francisco, Jun. 24, 1997.

Notice of Allowance for U.S. Appl. No. 10/984,300; 8 pages; dated Feb. 24, 2010.

Goldsleger, "ORGA sets its course for Growth" SOURCE: Orga Card Systems, Inc.. Paderborn, Germany, Jul. 26, 1998.

International Search Report and Written Opinion for PCT Application No. PCT/US06/06315; Sep. 24, 2007; 9 pages.

U.S. Appl. No. 11/557,131; filed Nov. 7, 2006; 40 pages.

AU Examination Report for AU Application No. 2005295786; 2 pages; Jul. 7, 2010.

Notice of Allowance for U.S. Appl. No. 10/984,300; 8 pages; dated Aug. 19, 2010.

JP Office Action for Application No. 2007-536842 dated Jun. 14, 2011; 9 pages (includes English translation).

U.S. Appl. No. 12/974,012, filed Feb. 16, 2011; 20 pages.

EP Office Action for Application No. 05728315.2; Dec. 3, 2009; 238 pages.

JP Office Action for Application No. 2007-540163 dated Aug. 23, 2011; 9 pages (includes English translation).

* cited by examiner

SYSTEM AND METHOD FOR FACILITATING A WIRELESS FINANCIAL TRANSACTION

TECHNICAL FIELD

The present invention relates generally to the field of communications and, more particularly, to a system and method for facilitating a wireless financial transaction.

BACKGROUND

Financial markets generally afford the opportunity for investors to purchase an asset in order to achieve some degree of profitability. Investment vehicles such as stocks, trusts, mutual funds, pension funds, money markets, and bonds represent example investment instruments that offer investors a choice for allocating capital.

In many (but certainly not all) trading environments, trades take place in a trading pit where a face-to-face encounter occurs. This is where buyers and sellers physically converge on the specialist who matches buyers with sellers. However, electronic communications (via computers) play a big part in the trading process. All trades are "auctions." There is no set price, although the last trade is often considered to be the "price" of a stock. In reality, the price is the highest amount any buyer is willing to pay at any given moment. When demand for a certain stock is high, the various buyers bid the price higher to induce sellers to sell. When demand for a stock is low, sellers must sell at lower prices to attract buyers and the price drops.

Once a trader is duly authorized in any given system, traders can then begin feeding trade requests to the trading pit such that their proposed transactions can be secured. In most scenarios, traders are simply accommodating the needs of their clients or customers who are seeking to purchase or to sell a given commodity. Note that the trader's actual "trading desk" can be quite comprehensive, as well as restricting and cumbersome. Traders are normally equipped with a number of phone lines, as well as a number of data feeds that allow the given trader to be aware of market prices, market actively, and news that may affect the markets. This information is exceptionally time sensitive, as real-time data represents a powerful tool for any successful trader. In addition, such data feeds need to effectively transport corresponding market data: maintaining the integrity of the information as it propagates across the network. Potentially millions of dollars (involved in a single trade) lie in the delicate balance, as even the smallest computational error or even the most minor data corruption could spell financial disaster for the associated trader.

Hence the ability to offer a convenient and an effective platform for executing optimal trading presents a significant obstacle for system designers, network architectures, and component manufacturers.

SUMMARY

Due to a variety of factors, Internet-based electronic financial systems may have a number of undesirable aspects. For example, the Internet lacks the security necessary to ensure confidence that operation of an electronic financial system will proceed without the possibility of tampering or corruption. An operator of an Internet financial system is vulnerable to hacking, viruses, fraud, and other shortcomings associated with conducting business over the Internet. Users of Internet-based systems often lack confidence that their financial transactions are secure, that they will be properly authenticated, and that their privacy will remain intact. Moreover, the use of the Internet does not provide location verification suitable to ensure that a user is within an approved financial area.

In one embodiment, a method for executing a wireless trade is provided that includes communicating with a handheld device via a wireless network and sending and receiving financial information to and from the handheld device. The financial information is associated with a trade that can be initiated by the handheld device. The method also includes authorizing the handheld device through location data, which is associated with a location of the handheld device, before executing the trade.

In a more particular embodiment the present invention, a method is provided that includes authorizing the handheld device for a trade through location data, which is associated with a location of the handheld device, before executing the trade. Authorization of a given end user may be achieved via any suitable element (e.g. a phone ID, a system ID, an application ID, a tradedesk verification mechanism, a user ID, a picture ID, a biometric parameter, etc.) and be accorded various levels of security.

Various embodiments of the present invention may benefit from numerous advantages. It should be noted that one or more embodiments may benefit from some, none, or all of the advantages discussed below. One advantage associated with the proffered architecture is that it enables remote, wireless, and mobile financial transactions over a secure network. The architecture also achieves remote, wireless, and mobile capabilities while preventing access to unauthorized users, providing a secure connection and preventing the execution of financial transactions from unauthorized locations. The system also includes a number of financial communication devices for a group of end users: the devices being connected to a communication network, whereby a portion of the communication network is mobile. This provides greater flexibility to the traders, as they are afforded the opportunity to execute their transactions in any number of acceptable environments.

Still another technical advantage of the present invention relates to the combination of a secure and a private wireless network that is used to determine the precise geographic location of traders. This in turn allows the architecture to determine whether or not trading is permitted from their specific location. The system can facilitate and expedite trading from permitted locations and preserve the audit trail of all keystrokes for all participants.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF EXAMPLE EMBODIMENTS OF THE INVENTION

Figure 1A:
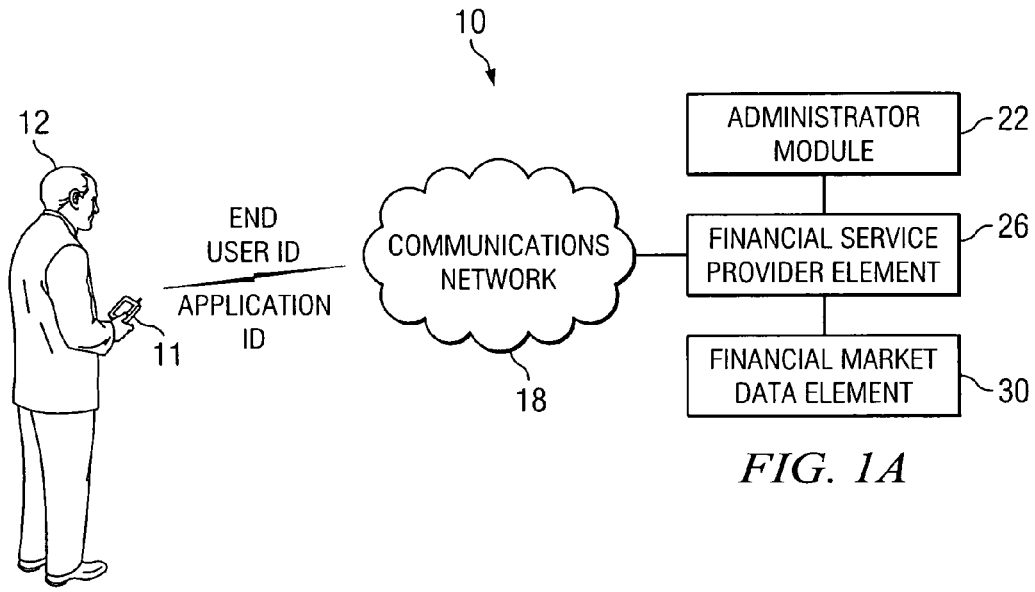
FIG. 1A is a simplified block diagram that illustrates a convenience financial system according to an embodiment of the present invention.

FIG. 1A is a simplified block diagram of a convenience financial system 10 that offers an opportunity for mobile traders to engage in any financial market environment. Financial system 10 comprises multiple end users 12 who may be using any suitable device such as a handheld device 11, which is illustrated in FIG. 1. FIG. 1 may also include a communications network 18, an administrator module 22, a financial service provider element 26, and a financial market data element 30. The handheld device may include a user interface that may include a number of elements that offer connectivity for one or more end users 12 to other elements within financial system 10.

In accordance with the teachings of the present invention, financial system 10 provides a convenience financial system enabling participants to engage in financial activities from remote and/or mobile locations. The possible financial activities include trading, such as that which is offered by any number of financial markets. Trading activities may include any suitable financial transactions including, but not limited to, trading securities (both long and short positions), trading futures, trading bonds, trading commodities, trading in money markets, or trading in any other appropriate asset class. Trading may be placed in any suitable financial market, such as the FTSE, the German DAX, the French CAC, the NASDAQ, the American Exchange (AMEX), the New York Stock Exchange, the Nikkei, the bond or treasury markets, and the Hang Seng Index, for example. Other financial markets could readily be accommodated by financial system 10.

The architecture of financial system 10 offers the combination of a secure and a private wireless network that is used to determine the geographic location of traders. This in turn allows the architecture to determine whether or not trading can be executed from their location. The system can facilitate and expedite trading from permitted locations and preserve the audit trail of all keystrokes. The system tracks the location of the trader, recognizes the identity of the trader, facilitates and expedites trading activity from permitted locations, and prohibits trading from unauthorized and/or prohibited geographic locations. Access points are used to grant access to the network for the end user of handheld device 11. In addition, any suitable market data, as well as bond and treasury information, may be provided to an end user in real-time such that optimal trading is achieved for any selected individual.

Convenience financial system 10 may be implemented over communications network 18, which could be a cellular network or a private wireless and/or wireline network. Examples of the latter include WiFi and WiMax networks. In one embodiment, the convenience financial system operation uses the Internet, such that information for which there are no security issues present is transmitted via the Internet, whereby information may be suitably encrypted where appropriate. Preferably, the communications network enables traders to participate in financial activities from remote locations (e.g., outside of the designated financial area of a work domain or a marketplace). Also, the system may enable traders to be mobile during participation in their financial activities. Preferably, the system has a location verification or determination feature, which is operable to permit or to prohibit financial activities from the remote location: depending upon whether or not the location and the individual meet one or more criteria. The criterion may be, for example, whether the individual is duly authorized for the trade and whether the location is within a pre-defined area in which financial activities are permitted.

Note that the present architecture offers considerable flexibility and convenience for one or more traders. As can be readily appreciated, a given trading desk is comprehensive. A trading desk setup may include multiple trading screens that allow for a trader to be provided with real-time information such that effective trading can be executed quickly and accurately. Thus, moving such a trading station is not merely accomplished by packing up a laptop and migrating to a new location. Moving employees (who are engaged in the process of trading securities, commodities, etc.) to a new location can be an arduous task. This is because considerable energies are spent in coordinating a move from one location to another. In contrast to such labor-intensive ordeals, the present architecture can simply assign an IP address to a given end user and have that IP address track the end user to any suitable environment. Thus, a given end user could log onto a given network at various locations within a coverage area: granting him the flexibility to transact his financial trading without being encumbered by authorization limitations or boundary restrictions.

As shown in FIG. 1A, in an example implementation, convenience financial system 10 includes at least one end user 12. The system may include additional users such that there is at least a first end user and a second end user. Multiple users may access a first financial system 10, while other multiple users access a second financial system (not shown) in communication with first financial system 10. In operation, end users 12 preferably access system 10 by way of handheld device 11 (e.g. any suitable device for transmitting and receiving electronic communications such as mobile phones, personal data assistants (PDAs), computers, mini-computers, etc.). Authorization of a given end user may be achieved via any suitable element (e.g. a phone ID, a system ID, an application ID, a tradedesk verification mechanism, a user ID, a picture ID, a biometric parameter, etc.) and be accorded various levels of security. In this example scenario, end user 12 communicates his ID and the application ID in order to achieve appropriate authorization. Financial communication devices transmit and receive financial information to and from communications network 18. Financial information is also transmitted between communications network 18 and a computer, which may reside within (or included in the domain of) financial service provider element 26. The location of the computer is not critical, however, and the computer may reside adjacent to or be remote from the domain of financial service provider element 26. The computer and/or financial service provider element 26 may reside within, adjacent to, or remote from a financial provider (not shown in FIG. 1A). The financial service provider may be an actual controller of trading, such as eSpeed, Inc. As an example, a financial service provider may be located on the grounds of a building in New York, N.Y.

In one example embodiment, software resides on both handheld device 11 being operated by end user 12 and financial service provider element 26. Software resident on handheld device 11 is preferably operable to present information corresponding to financial activities to the end user. The information includes, without limitation, graphical representations of objects associated with the trading activities, and presentation of options related to the trading activities selected by the end user. The financial communication device software is also preferably operable to receive data from the computer and data input by the user. Software resident on the computer is preferably able to exchange data with the financial communication device, access additional computers and data storage devices, and perform all of the functions described herein as well as functions common to known electronic financial systems.

Financial information transmitted across communications network 18 may include any information, in any format, which is necessary or desirable in the operation of the financial experience in which the user participates. The information may be transmitted in whole, or in combination, in any format including digital or analog, text or voice, and according to any known or future transport technologies, which may include, for example, wireline or wireless technologies. Wireless technologies may include, for example, licensed or license-exempt technologies. Some specific technologies which may be used include, without limitation, Code Division Multiple Access (CDMA), Global System for Mobile Communication (GSM), General Packet Radio Service (GPRS), WiFi (802.11x), WiMax (802.16x), Public Switched Telephone Network (PSTN), Digital Subscriber Line (DSL), Integrated Services Digital Network (ISDN), or cable modem technologies. These are examples only and one of ordinary skill will understand that other types of communication techniques are within the scope of the present invention. Further, it will be understood that additional components may be used in the communication of information between the users and the financial server. Such additional components may include, without limitation, lines, trunks, antennas, switches, cables, transmitters, receivers, computers, routers, servers, fiber optical transmission equipment, repeaters, amplifiers, etc.

In at least one embodiment, the communication of financial information takes place without involvement of the Internet. This has an advantage of avoiding the security problems, which typically arise when conducting business over the Internet. However, in certain embodiments, a portion or all of the financial information may be transmitted over the Internet. Also, some or all of the financial information may be transmitted partially over an Internet communications path. In certain embodiments, some information is transmitted entirely or partially over the Internet, but the information is either not financial information or is financial information that does not need to be maintained secretly.

End users 12 are clients, customers, prospective investors, or entities wishing to place a trade. End users 12 may also seek to access or to initiate a communication with a user interface that may be delivered via communications network 18. End users 12 may review data (such as performance characteristics) associated with a particular commodity, stock, or market in order to take a position (execute a trade) in any given financial target. Alternatively, end users 12 may represent any object that seeks to initiate a communication on behalf of another entity or element, such as a program, a database, or any other component, device, element, or object capable of initiating a voice or a data exchange within financial system 10. Note also that "data," as used herein in this document, refers to any type of numeric, voice, or script data, or any other suitable information in any appropriate format that may be communicated from one point to another.

End user 12 may participate in a trade, which represents the legal instrument that may be used to bind end user 12 to a stipulated agreement. A trade may take any appropriate form such as a written document, an e-mail, a facsimile message, a computer display, an entry in an account, or a verbal agreement between two parties. Such a trade is flexible in its terms, representations, and stipulations. In general, any information or data that may be germane or of interest to a trading participant or a hosting entity may be included in a trade, provided that the included terms are mutually agreeable to the two (or more) parties bound by the trade.

A user interface, which is included within handheld device 11, is an element that facilitates trading on a selected financial market. A user interface is operable to receive and to process requests associated with transactions relating to a trade. A user interface provides a portal for end users 12 to access other elements of financial system 10. A user interface may be a computer for any person, business, or entity that seeks to manage or facilitate trading activity. Accordingly, a user interface may include any suitable hardware, software, devices, components, elements, or objects that may be utilized or implemented to achieve such operations and functions in a financial environment.

Alternatively, a user interface (and the examples thereof) may be replaced with any other suitable interface or object that facilitates communications between end user 12 and any other element within financial system 10, such as: a cellular telephone, an electronic notebook, a personal digital assistant (PDA), or any other suitable device (wireless or otherwise), component, or element capable of accessing one or more elements within financial system 10. The end user interface may also comprise any suitable interface for a human user such as a display, a microphone, a keyboard, or any other appropriate terminal equipment according to particular configurations and arrangements. In addition, the end user interface may be a unique element designed specifically for communications involving a trade. Such an element may be fabricated or produced specifically for financial applications involving end user 12.

A user interface may be owned and operated by any suitable entity having the ability and/or authority to operate in the financial industry. A connection may be established between a user interface and any other financial exchange (e.g. via financial service provider element 26), whereby information associated with the exchange is delivered to end user 12 and may be reviewed before executing the transaction. Thus, a user interface may deliver real-time financial data to end user 12 in order to provide pertinent financial information to be used to make decisions as to whether to purchase or to sell a given asset. This financial information may be retrieved from financial market data element 30 or any other suitable element. Financial market data element 30 may relay data (potentially inclusive of rich media content that offers enhanced audio and video streaming information such as pricing information, market lines, maturity data, financial graphs and charts, historical quotes, or moving averages, for example) to end users 12. Other pertinent financial data may also be readily delivered and based on particular needs. In order to deliver information that is accurate and timely, financial market data element 30 may be coupled directly to a corresponding exchange communications link that carries such financial data. Alternatively, financial market data element 30 may gather such critical information from any appropriate location (e.g. a news wire or a server operable to deliver real-time information to investors) such that the desired data is delivered to end user 12.

It is critical to note that the term "handheld device" as used herein in this document encompasses any suitable user interface as well as any of the other objects previously identified, which can assist end user 12 in his financial/trading endeavors. Thus, the term "handheld device" is an all-inclusive term that should be construed broadly to embrace all such tools and equipment that aid the end user in his activities. Such handheld devices may be manufactured by companies such as Dell, Nextel, Motorola, Nokia, RIM, etc.

Currently, handheld units used at floor exchanges must be checked in and out by traders as they enter or leave the trading floor. The usability of the handheld is governed by limiting its physical position to within the permitted location, i.e. the only way to prohibit trading from prohibited locations, or by unauthorized persons, is to permit the handheld to be used only within secure spaces within the exchange premises. An application of the architecture of the present invention can: 1) use the wireless technology to permit activation of the wireless device at permitted trading locations; 2) use secure identification technology to confirm the identify of the user and prohibit use by unauthorized users; and 3) use electronic trading technologies to facilitate effective use of the wireless unit to engage in market activity. The operation of financial system 10 solves the problems that floor exchanges face with respect to controlling the use of their handheld units. This may be achieved while expanding the geographic areas from which authorized financial market participants may participate in exchange-based or over-the-counter trading of securities. Other applications may include the trading of derivatives, and other forms of tradable financial instruments and financial or physical assets, or any other securities, or commodities whose trading is regulated by government bodies, regulatory agencies, or simple industry groups.

Counterparties may remain anonymous throughout the trading process pursuant to the rules of the marketplace and its credit requirements, while secure and efficient functioning of the marketplace is provided for trading participants. Note that the provider of data (e.g. eSpeed, Inc.) and regulatory agencies (e.g. the Securities and Exchange Commission (SEC)) can also benefit from auditing capabilities of the handheld device. For example, keystroke recordation can be used to verify that end user "John James" logged into his handheld device at 9:08 AM (EST), reviewed two news items, and then proceeded to execute a trade, which involved the sale of 10,000 shares of Intel stock. A simple keystroke logging element may be provided within handheld device 11 and/or financial service provider element 26 to achieve this result.

Communications network 18 is a communicative platform operable to exchange data or information between end user 12 and a user interface. Communications network 18 represents an Internet architecture in a particular embodiment of the present invention, which provides end user 12 with the ability to electronically execute or initiate transactions associated with a trade. Alternatively, communications network 18 could be a plain old telephone system (POTS), which end user 12 could use to perform the same operations or functions. In other embodiments, communications network 18 could be any packet data network (PDN) offering a communications interface or exchange between any two nodes in financial system 10. Communications network 18 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

Administrator module 22 is an element that cooperates with financial service provider element 26 in order to ensure a fair and proper execution of transactions initiated by end user 12. Administrator module 22 is an optional component of financial system 10. Administrator module 22 may be used in certain embodiments to control any operation of financial service provider element 26. For example, administrator module 22 may be used to manually set trading parameters, to approve margin requests, or to halt specific trading activities. In selected instances, administrator module 22 may call for additional margins throughout the day without waiting for a routine end-of-day settlement. In still other scenarios, administrator module 22 may be used for more simplistic monitoring functions or included within financial service provider element 26, where appropriate.

Figure 1B:
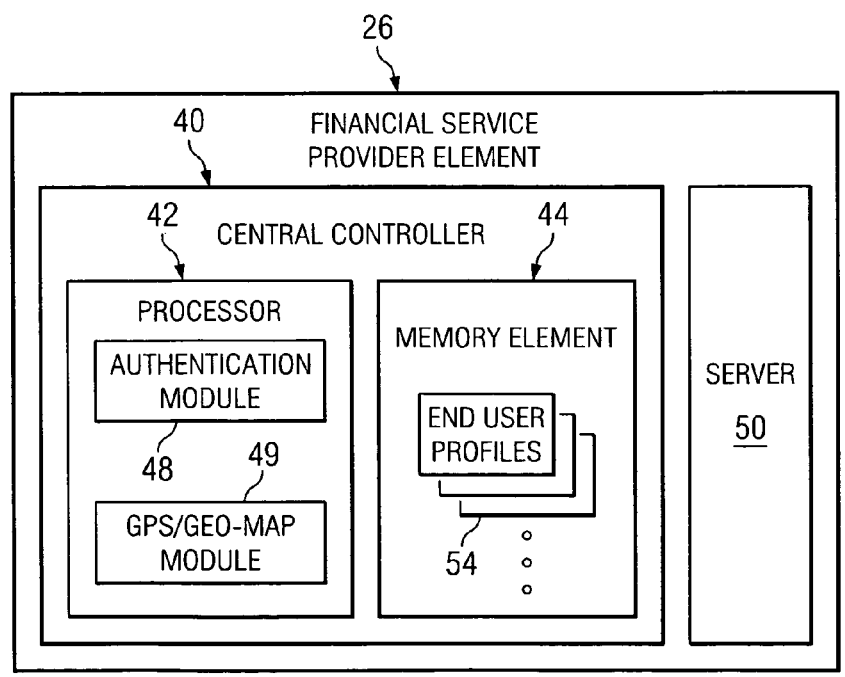
FIG. 1B is a simplified block diagram that illustrates a component that may be included within the system of FIG. 1A.

FIG. 1B is a simplified block diagram of financial service provider element 26, which may include a processor 42, a memory element 44, and a server 50 in accordance with one example embodiment of the present invention. Financial service provider element 26 is operable to receive requests from end user 12 and to process those requests such that financial transactions involving a trade are executed. The resultant trade that is generated may be suitably stored in memory element 44 after being properly managed and secured by processor 42. Processor 42 may also assist in processing any financial terms or conditions requested by end user 12. In cases where financial service provider element 26 is unable to match the requested financial parameters or tendered trade terms provided by end user 12 with that which is available in the marketplace. Financial service provider element 26 may contact end user 12 and notify end user 12 of the circumstances surrounding the inability to fulfill such a trade.

Processor 42 may comprise any suitable processor that executes a trading system application or other computer instructions that facilitate trading. Processor 42 may include an authentication module 48, which operates to verify the identity of end user 12. Authentication module 48 may utilize global positioning satellite (GPS) or geographic data (or any other suitable location data) stored in a GPS/Geo Map module 49 in connection with offering simple authentication procedures. In order to execute optimal authentication procedures, processor 42 may access one or more end user profiles 54 and server 50. Server 50 may operate to obtain or to receive GPS or geographic information from GPS/Geo Map module 49 associated with a given end user 12 who is seeking to execute a trade. Thus, financial service provider element 26 may provide a location verification component or feature for handheld device 11 via any number of appropriate modules included within processor 42.

Processor 42 may be a CPU or a microprocessor and include any suitable number of processors working together. Processor 42 is generally operable to execute various algorithms, computations, or calculations to determine current trade data. Processor 42 may determine such current trade data based on data received from memory element 44 and/or financial market data element 30. In addition, processor 42 may update such current trade data based on new information being received from financial market data element 30. In some embodiments, processor 42 may update current trade data in real-time, substantially in real-time, or at preset intervals (such as every thirty-five seconds, for example).

Memory element 44 may comprise one or more memory devices that facilitate trading (or that store information relating thereto), such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. Memory element 44 is also generally operable to store data that may be used by processor 42 such that GPS/Geo Map 49 is unnecessary. Alternatively, GSP/Geo Map module 49 may be any of the above-identified items such that GPS and/or geographic data are stored and can be accessed.

It should be noted that the internal structure of financial service provider element 26 is malleable and can be readily changed, modified, rearranged, or reconfigured in order to achieve its intended operations. Additionally, the elements included within financial service provider element 26 may interact in any suitable manner. As identified supra, software may reside in financial service provider element 26 and in handheld device 11 in order to achieve the teachings of the present invention. However, due to their flexibility, these two elements may alternatively be equipped with (or include) any suitable component, device, application specific integrated circuit (ASIC), hardware, software, processor, microprocessor, algorithm, ROM element, RAM element, EPROM, EEPROM, FPGA, or any other suitable element or object that is operable to facilitate the operations thereof. Considerable flexibility is provided by the structure of financial service provider element 26 in the context of financial system 10. In this context, the illustrated components of financial service provider element 26 may be deleted, substituted, replaced, combined, or enhanced in order to achieve the teachings of the present invention.

Memory element 44 of financial service provider element 26 may store information regarding the various types of different trades that may be placed (and their respective outcomes) in financial system 10. Memory element 44 may also store various financial instruments and a plurality of end-user profiles 54. Memory element 44 may additionally store information associated with a financial instrument number (FIN), a description of the market(s) that are the subject of the particular trade, a designated duration/expiry, and a commission (or fee) established for the particular trade. These fields (and others) may be defined in numerous ways within the scope of the present invention. For example, the term 'expiry' may refer to a particular closing or settlement time and/or date for the financial instrument to close, or it may be based on the events themselves that may be completed at some arbitrary or specific date in the future (e.g. at the closing bell).

Additionally, each end-user profile 54 may include any relevant information associated with end user 12, his trading activity, or his finances. For example, items such as his account numbers, transactional history, company information, balances, commissions, available funds, and potential debits/credits may be reflected in a profile. End-user profiles 54 may be pin-accessed by end user 12 (via handheld device 11) or accessed (at the direction of handheld device 11) solely by an entity or administrator authorized to do so.

Financial service provider element 26 may identify an end users' location (e.g. via a GPS system). Location data of the trader can be used in order to control trading activity. Certain zones may be designated for trading, whereas other zones may be strictly off limits. For example, trading could be only executed on the trading floor and in the cafeteria (of an associated building), but strictly prohibited in the bathrooms and the lobby.

Note that other areas could certainly be designated for trading purposes. However, the configuration of such alternative locations is somewhat different as compared to secure trading within the confines of a given authorized area. For example, if an end user, who is working in Manhattan, N.Y., opts to leave the trading floor of the New York Stock Exchange and grab a coffee at a local coffee shop, he may be provided with the opportunity to execute a trade once he arrives at the new location. Consider an example where the same end user is drinking his morning coffee and monitoring commodity prices via his handheld device. At some point, a news story breaks that relates to a potential conflict in the Middle East. The trader immediately recognizes that gold prices are most likely going to rise in the wake of such an announcement. From his current location at the coffee shop, the end user may log into his handheld device, be properly authenticated, and be permitted to execute a trade involving gold. Thus, once the end user departed from his office, he left a secure, managed, and protected network. The system at the coffee shop is configured in a different manner. The handheld device may still access a given network via a suitable access point, but the traffic may be routed in a different fashion. A secure protocol may be provided to ensure that the information propagating from the handheld device is secure. User name and password entries that are input by the end user could also assist in protecting this traffic flow. Once, properly authorized, the information may propagate in a secure mode to a receiving network, where it can be relayed to financial service provider element 26.

Hence, the present architecture may allow a party's identity and location to be confirmed (e.g. using GPS technology to provide location data) before allowing that person to execute a trade. A suitable location verification component may be provided in both financial service provider element 26 and handheld device 11 to achieve such operations. If a question exists about whether or not to permit the trader to execute the trade (particularly in cases where the end user has roamed outside of the work area, which generally represents a more secure environment), a simple phone call could be made to the trader to verify the proposed trading activity. The conversation could be conducted as follows:

Speaker 1: "May I speak with John James, this is Darrin Knight from eSpeed, Inc."

Speaker 2: "This is John."

Speaker 1: "I see that you are at a coffee shop on 57th Street and 9th Avenue. I also see that you are about to place a trade for 8,000 shares of Cisco stock. Is all of that correct?"

Speaker 2: "Yes."

Speaker 1: "Could you confirm your password for me?"

Speaker 2: "Hoosier."

Speaker 1: "Correct. Sorry to trouble you, we just wanted to verify this information for your own financial protection. On behalf of eSpeed, Inc., have a wonderful day."

Note that "tablet" personal computers could readily benefit from the teachings of the present invention. Tablet personal computers generally allow for wireless communications in a given environment. This, in turn, allows for the ability to be mobile in a work environment without compromising security or anti-hacking protocols. When an end user leaves the work environment, he generally leaves the secure (e.g. 802.11) platform and enters into any number of network access configurations (e.g. WiMax), which may or may not be as secure. Thus, a trade off exists when an end user roams from a work environment (having specified work boundaries)

to another location outside the work domain. In the work environment, an abundance of data may be delivered to the end user, whereby any suitable number of end users can be accommodated. Capacity constraints and security problems are generally not prevalent in the work environment, as the work environment provides a robust and a safe solution for its associated trading participants. Real-time data may effectively propagate to the end user and the end user can confidently execute any financial transaction over a secure connection.

In contrast to this paradigm, when the end user is outside of the work domain or the "work castle" his actions may be significantly restricted. For example, the end user may not be able to receive all the data that was previously being delivered to him. He may only be able to receive more basic types of data (e.g. current trading prices of a commodity, but not necessarily the bid and offer information). Also, the data may not be in real-time. In addition, the end user may be limited in the types of trades that he is allowed to execute. Any such limitations can be addressed and resolved by the present invention. Enhanced end user capabilities may be provided based on specific network arrangements and handheld device configurations and are readily accommodated by convenience financial system 10.

Note that in cases where a device is misplaced, stolen, or lost, an administrator could be contacted to address the situation. The administrator could respond by sending a "kill message" to the handheld device that effectively disables the device. The kill message may also be able to erase all information stored in the handheld device such that stored information is protected.

Figure 2:
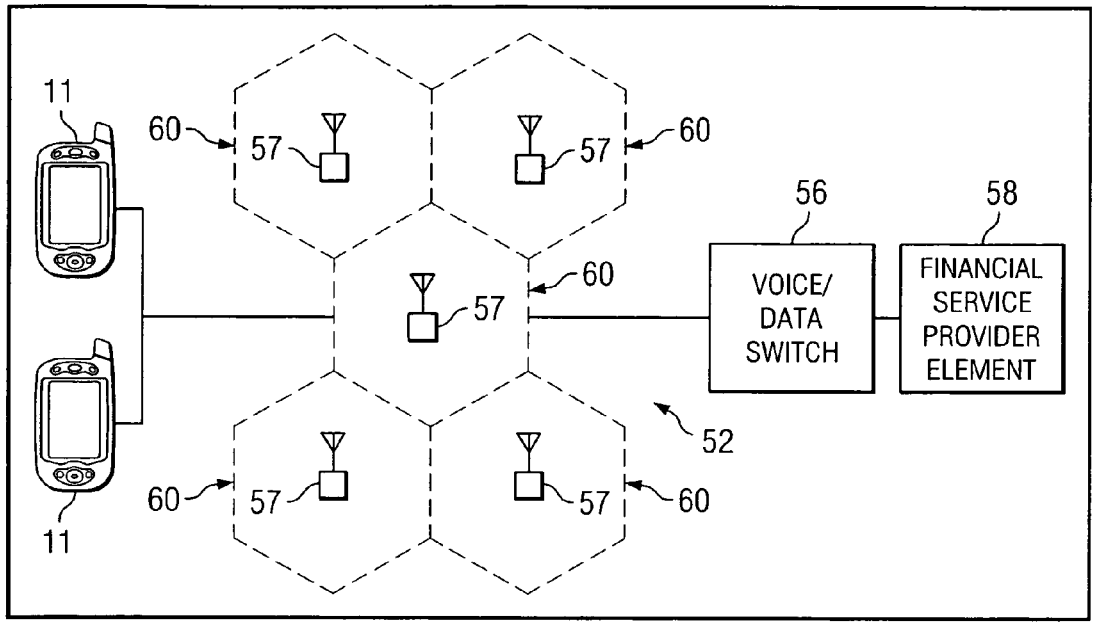
FIG. 2 illustrates a convenience financial system with a wireless network according to an embodiment of the present invention.

Turning to FIG. 2, which illustrates one example embodiment, the communications network comprises a cellular network 52. Cellular network 52 comprises a plurality of base stations 57, each of which has a corresponding coverage area 60. Base station technology is generally known and the base stations may be of any type found in a typical cellular network. The base stations may have coverage areas that overlap. Further, the coverage areas may be sectorized or non-sectorized. The network also includes handheld devices 11, which function as the financial communication devices used by users to access the convenience financial system and to participate in the activities available on the convenience financial system. Users are connected to the network of base stations via transmission and reception of radio signals. The communications network also includes at least one voice/data switch, which is preferably connected to the wireless portion of the network via a dedicated, secure landline. The communications network also includes a financial service provider element 58, which is likewise connected to a voice/data switch 56 via a dedicated, secure landline. The voice/data switch may be connected to the wireless network of base stations via a mobile switching center (MSC), for example and the landline may be provided between the voice/data switch and the MSC.

Preferably, in the case of a cellular network for example, the convenience financial system can be enabled through the use of a private label carrier network. Each base station is programmed by the cellular carrier to send and receive private secure voice and/or data transmissions to and from mobile station handsets. The handsets are preferably pre-programmed with both financial software and the carrier's authentication software. The base stations can communicate via Private T-1, T-3, or E-1 lines to a suitable switch. A provider generally leases a private T-1, T-3, or E-1 line, which routes the calls back to financial servers controlled by the financial service provider. Encryption can be installed on the telephones if required by a financial regulation authority, such as a financial commission for example.

Figure 3:
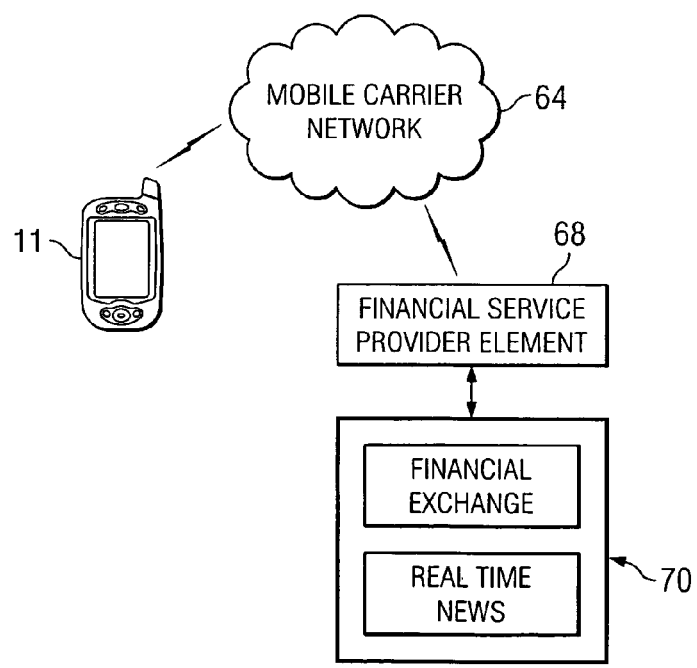
FIG. 3 is a block diagram of a convenience financial system illustrating various financial activities in accordance with an embodiment of the present invention.

As shown in another example, which is illustrated in FIG. 3, handheld device 11 is in communication with a financial service provider element 68 over a mobile carrier network 64. The financial service provider element 68 can include one or more connections to other platforms or servers, on which are resident various financial and other applications. As shown in FIG. 3, some example financial applications include financial exchange and real-time news 70. Each of these applications may be embodied in one or more modules, be included in financial service element 68, or be provided by some other entity. These applications may be included in financial market data element 30 or simply provided as a link that may be used by end user 12. It should be understood that these applications are not exhaustive and that other applications may exist to provide an environment to the user that is associated with any of the described or potential convenience activities.

Figure 4:
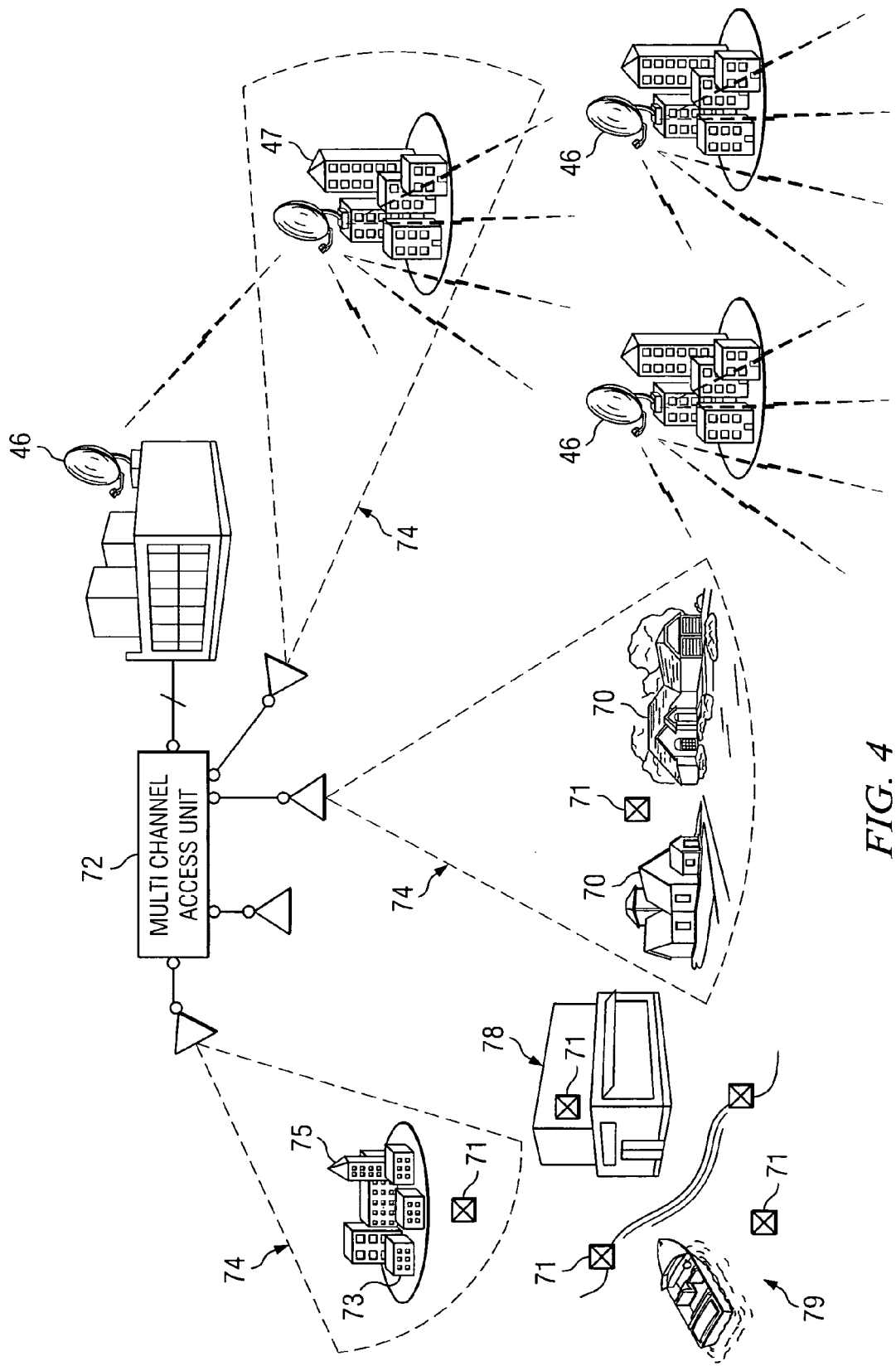
FIG. 4 illustrates a convenience financial system showing example coverage areas in accordance with an embodiment of the present invention.

In another example embodiment, as shown in FIG. 4, the communications network comprises a private wireless network. The private wireless network may include, for example, an 802.11x (WiFi) network technology to cover multiple trading areas 74 that are in a work environment or a residential/home environment. In FIG. 4, various WiFi networks 71 are illustrated. Networks 71 may use other communications protocols to provide a private wireless network including, but not limited to, 802.16x (WiMax) technology. Further, networks 71 may be interconnected where appropriate. Also, a convenience financial system may comprise a combination of networks as depicted in FIG. 4. For example, there is shown a combination of private wireless networks, a cellular network comprising a multi-channel access unit or sectorized base station 72, and a satellite network comprising one or more satellites 46.

The private wireless network may be particularly well suited for financial trading needs of location and identity verification for end users. Alternatively, trading areas enabled by networks 71 may include, for example, a coffee shop 78 and swimming pools, lakes or other recreational areas 79. Primary trading areas 74 may include residential area 70, offices and restaurants such as might be found proximate to work area 73, adjacent buildings 75, and remote buildings 47, which could reflect a branch office located on the other side of town. The configuration of the overall convenience financial system depicted in FIG. 4 is malleable, as it is intended only as an example of the present invention.

In one example embodiment, the system architecture for the financial system includes:

(1) a wireless LAN (Local Access Network) component, which consists of mostly 802.11x (WiFi) and/or 802.16x WiMax technologies; robust security and authentication software; financial software; mobile carrier approved handsets with Windows® or Symbian® operating systems integrated within; and (a) CDMA-technology that is secure for over-the-air data protection;

(b) at least two layers of user authentication, (that provided by the mobile carrier and that provided by the financial service provider);

(c) compulsory tunneling (static routing) to financial servers;

(d) end-to-end encryption at the application layer; and (e) state-of-the-art firewall and DMZ technologies;

(2) an MWAN (Metropolitan Wireless Access Network), which consists of licensed and license-exempt, point-to-point links, as well as licensed and license-exempt, point-to-multipoint technologies;

(3) private MAN (Metropolitan Access Network) T-1 and T-3 lines to provide connectivity where wireless services cannot reach; and (4) redundant private-line communications from the mobile switch back to the financial server.

Each of trading areas 74 is preferably connected via the MWAN/MAN back to central and redundant financial service provider elements (such as those described above). For accessing the private wireless networks 71, the handheld devices are preferably WiFi- or WiMax-enabled PDAs or mini-laptops, and do not have to be managed by a third-party partner.

Preferably, the convenience financial system includes a location verification feature, which is operable to permit or to disable financial activities from a remote location depending upon whether or not the location meets one or more criteria. The criterion may be, for example, whether the location is within a pre-defined area in which financial activities are permitted by the sponsoring trading entity. As another example, the criterion may be whether the location is in a no-trade zone, such as designated bathrooms and lobby areas. Such assignments of location are arbitrary and, thus, may be varied considerably. The location verification technology used in the system may include, without limitation, "network-based" and/or "satellite-based" technology. Network-based technology may include such technologies as multilateration, triangulation and geo-fencing, for example. Satellite-based technologies may include GPS technology, for example or other suitable protocols that perform the functions outlined herein.

As previously discussed, the cellular approach preferably includes the use of at least one cellular, mobile, voice and data network. For financial activities in certain areas, the technology may involve triangulation, GPS technology, and/or geo-fencing to avoid the potential for trades to be made outside proscribed areas. Hence, triangulation may be used as a method for preventing financial activities from unapproved locations. Triangulation may be accomplished, for example, by comparing the signal strength (from a single handheld device) received at multiple base stations, each having GPS coordinates. This technology may be used to pinpoint the location of a handheld device. The location can then be compared to a map or to another resource to determine whether the user of the handheld device is in an unapproved area. Alternatively, GPS technology may be used for these purposes.

Figure 5:
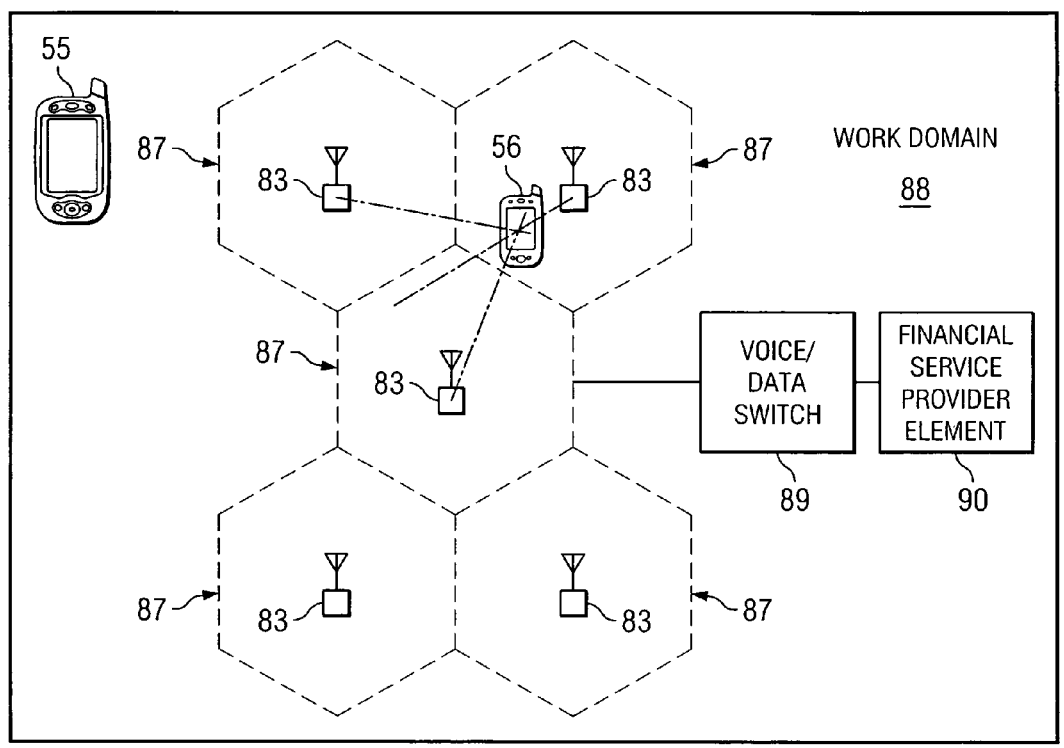
FIG. 5 illustrates a convenience financial system with a wireless network showing triangulation location determination in accordance with an embodiment of the present invention.

As shown in FIG. 5, the convenience financial system includes a plurality of handheld devices 53, 55, and 56. Handheld device 53 is located outside a large work domain 88. Work domain 88 may reflect the case where several work domains have been linked together. Devices 55 and 56 are both located inside work domain 88. However only device 56 is located within geo-fence 87, which is established by the coverage areas of a plurality of base stations 83. Thus, geo-fencing may be used to readily enable financial activities via handheld device 56. In other embodiments, handheld devices 53 and 55 may be able to execute trades, but be provided with limited trading capabilities.

Geo-fencing does not specify location: rather, it ensures that a given device is within certain boundaries. Triangulation on the other hand specifies a pinpoint, or near-pinpoint, location. For example, as shown in FIG. 5, device 56 is triangulated between three of the base stations 83 to determine the location of device 56. Triangulation may be used to identify whether a handheld device, such as a table PC, a laptop, or a PDA, is located in a specific spot where trading can be authorized. Preferably, the location determination technology utilized in conjunction with the present invention meets the Federal Communication Commission's (FCC's) Phase 2 E911 requirements, SEC guidelines, and any other regulatory agency (domestic or international) laws or regulations. Geological Institute Survey (GIS) mapping may also be utilized to compare identified coordinates of a handheld device with GIS map features or elements to determine whether a device is in an area not authorized for financial activity. It should be noted that any type of location verification may be used such as triangulation, geo-fencing, GPS technology, or any other type of location determining technology, which can be used to ensure, or to provide an acceptable level of confidence, that the user is within an approved trading area.

In another embodiment, location verification is accomplished using channel address checking or location verification using some other identifying number or piece of information indicative of which network or which portion of a network is being accessed by the handheld device. Assuming the utilization of an identifying number for this purpose, then according to one method of location checking, as an example, a participant accesses the financial system via a handheld device. The identifying number of the handheld device, or of the network component being accessed by the handheld device, identifies the caller's connection to the mobile network. The number is indicative of the fact that the caller is in a defined area and is on a certain mobile network. An application may be resident on the handheld device to communicate this information via the network to the financial service provider. In a related embodiment, the identifying number or information is passed from a first network provider to a second network provider. For example, a user's home network may be that provided by the second provider, but the user may be roaming on a network (and in an authorized trading area) provided by the first provider. The first provider passes the identifying information through to the second provider to enable the second provider to determine whether the user is in a defined area that does or that does not allow the relevant financial activity. Preferably the financial service provider either maintains, or has access to, a database that maps the various possible worldwide mobile networks identifying numbers to geographic areas. The invention contemplates using any number or proxy that indicates a network, portion of a network, or network component, which is being connected with a handheld device. The identifying number may indicate one or more of a base station or group of base stations, a line, a channel, a trunk, a switch, a router, a repeater, etc.

In another embodiment, when the user connects his handheld device to the financial server (e.g. server 50 of financial service provider element 26), the financial server draws the network identifying information and communicates that information to a financial service provider. The software resident on the handheld device may incorporate functionality that will, upon login or access by the user, determine the user's location (based at least in part on the identifying information) and send a message to the financial service provider.

In connection with any of the location determination methods, the financial system may periodically update the location determination information. This may be done, for example, during a financial session, at pre-defined time intervals to ensure that movement of the handheld device to an unauthorized area is detected during play, and not just upon login or initial access. Thus, depending on the location determination technology being used, the decision whether to permit, restrict, or prohibit a financial activity may be made at the handheld device, at the financial service provider element, or at any of the components of the network being used to transmit information between the handheld device and the financial service provider element (such as at a base station, for example).

An aspect of the private wireless network related to preventing or restricting financial activity in unauthorized areas is the placement of sensors, such as Radio Frequency Identification (RFID) sensors on the handheld devices. The sensors may trigger alarms if users attempt to use the devices outside the approved financial areas. Further, the devices may be "tethered" to immovable objects in other embodiments (e.g. a boat, a car dashboard, anywhere in an airplane, etc.). Users might simply log in to such devices using their ID and password.

In connection with FIG. 6, an example embodiment of a method according to the present invention can be described as follows. As discussed, software is preferably loaded on a handheld device and is operable to receive input data for trading activities. The input data may originate at associated financial software resident on a financial service provider element, or it may be input by the user of the handheld device. The software on the handheld device may be operable to present graphical representations of any of the other applications described herein.

Figure 6:
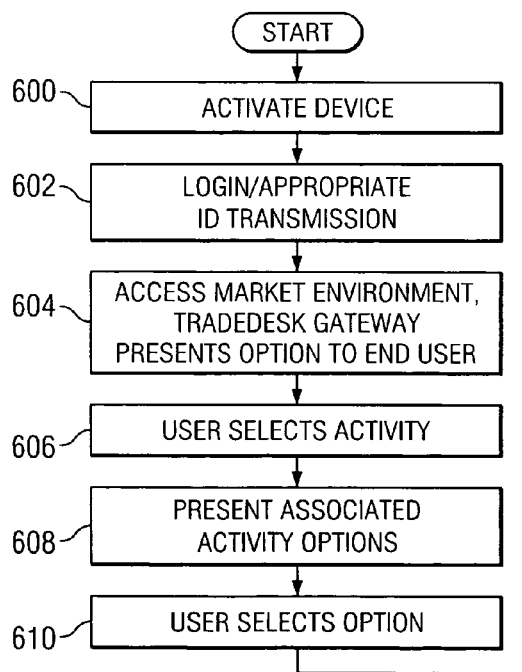
FIG. 6 is a simplified flowchart depicting example steps in a convenience financial method according to an embodiment of the present invention.
Figure 6:
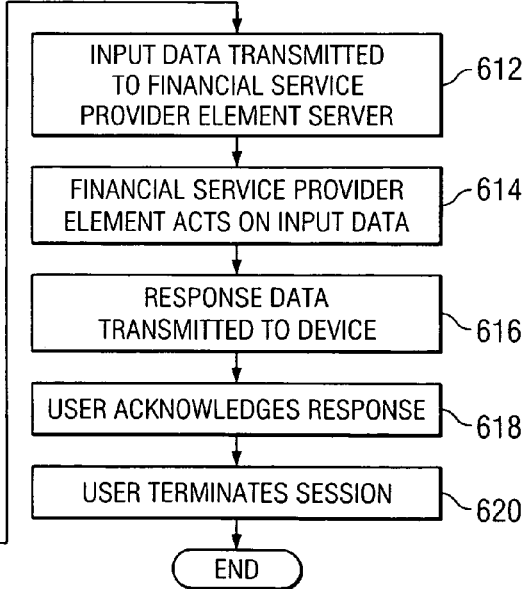

In the example method shown in FIG. 6, in a first step 600, the handheld device is activated. This may take place as a function of turning on a phone, PDA, a laptop, a table PC, or other communication device as described elsewhere herein. Preferably, activation comprises connecting the handheld device to a private data network. Part of the activation includes logging in via a device prompt. This may be considered as a first level of authentication of an end user of the handheld device. A second level of user authentication comprises authentication of the handheld device itself. This may occur, for example, by authentication of a device by a mobile carrier. A third level of user identification may comprise biometrics. Various examples of biometrics may include, but are not limited to, fingerprint identification, photo identification, retina scanning, voice print matching (and voice recognition protocols), etc. Thus, as can be readily appreciated, authorization of a given end user may be achieved via any suitable element (e.g. a phone ID, a system ID, an application ID, a tradedesk verification mechanism, a user ID, a picture ID, a biometric parameter, etc.) and be accorded various levels of security.

In a next step 604, the user is presented with the financial or market environment and a tradedesk gateway. The tradedesk gateway can query the end user to execute an electronic or a broker-assisted trade. In addition, the financial environment may be presented in various stages. For instance, in a first stage, the financial environment may comprise a financial summary of all markets where the user is presented with certain financial options including, for example, specific market summaries, specific prices for selected assets (e.g. commodities, stocks, bonds, etc.), current positions, buying power, etc. In a subsequent stage, the user may be presented with optional instances of the type of activity selected from the market platform.

In a next step 606, the user selects an activity, such as a particular type of trade. In step 608, the user is presented with one or more options related to the selected activity. In step 610, the user selects an option. For instance, at this point, the user might place a buy or a sell order on a financial exchange. In step 612, the software resident on the handheld device accepts the option input by the user and transmits the input data to financial service provider element 26. In step 614, the financial service provider element 26 acts on the input data.

Actions at this point may include, without limitation, determining an outcome and/or amount, accessing another server and/or software application, retrieving information, preparing a response to the user, etc. The action of determining an outcome and/or amount might take place, for example, if the user is using the device to place trades in connection with a selected exchange. The action of accessing another server and/or software application might occur, for example, in the event the user is engaging in a services activity such as accessing news services. The action of retrieving information might occur when the financial software (resident in financial service provider element 26) is prompted to access another server for the purpose of retrieving a certain type of information requested by the user. Financial service provider element 26 can then prepare a response to the user's input data in step 616. In step 618, the user acknowledges the response and in step 620, the user can log out and terminate his session.

Figure 7:
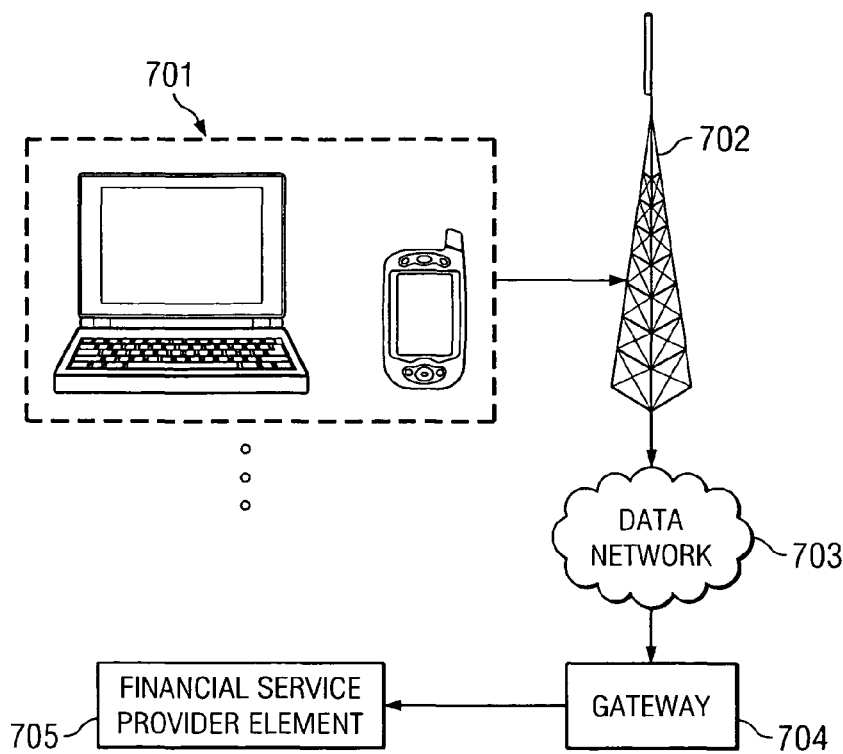
FIG. 7 depicts a convenience financial system showing an example communication path in accordance with an embodiment of the present invention.

Preferably, data is transmitted back and forth during the convenience financial activities between end user 12 and financial service provider element 26 controlled by the financial service provider. An example of the path of communication is shown in FIG. 7. Financial data, such as a trade placed by the user, is transmitted from handheld device 701 (e.g. a PDA, a laptop, etc.) to a base station 702 (or a transmitter in the case of a private wireless network such as a WiFi or WiMax network). Base station 702 can route the data through data network 703 to a hub or a gateway 704, which in turn routes the data to a financial service provider element 705. Preferably, the communication from handheld device 701 to the data network 703 comprises wireless communication. This may be any type of known wireless communication or any type of wireless communication available in the future. Examples of acceptable wireless communication protocols include CDMA, GSM, and GPRS.

Preferably, the communication from the data network 703 to the gateway 704 and to the financial service provider element 705 are conducted over secure landlines. FIG. 7 is an example communication network only and the present invention should be understood to cover other networks in which data may be transmitted from handheld device 701 to financial service provider element 705. Preferably, data in response to data being transmitted from handheld device 701 to financial service provider element 705 is transmitted back to handheld device 701 along a path essentially opposite to the path of the first transmission.

As identified previously, a unique aspect of the present invention includes establishing an electronic record of the financial transactions undertaken by a user. Preferably, this is accomplished by utilization of a keystroke log, which is an electronic record of all keystrokes made by the end user. Utilization of a keystroke log in this context also allows a financial control board or other regulatory authority, access to the electronic record in a direct manner in order to conduct periodic independent monitoring of the financial activities conducted over the system.

Figure 8:
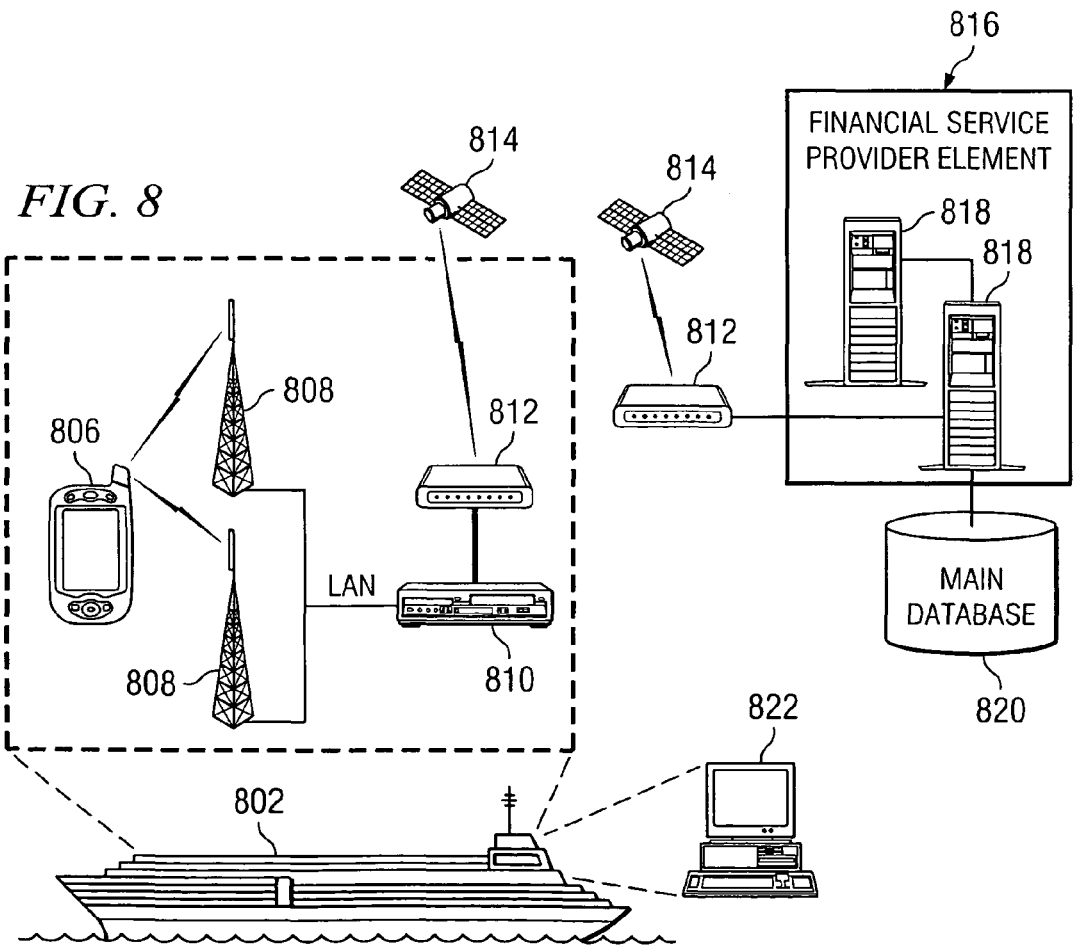
FIG. 8 illustrates a ship-based convenience financial system in accordance with another example embodiment of the present invention.

In another embodiment of the invention, as shown in FIG. 8, a ship-based convenient trading system is provided. The system preferably comprises passenger vessel 802, such as a yacht for example. The system includes one or more handheld devices 806 connected to a communication network. The network shown in FIG. 8 comprises a mobile network with base stations 808 connected via a LAN to a base station controller (BSC) 810. BSC 810 is connected via a T-1 or an E-1 interface to a first Very Small Aperture Terminal (VSAT) modem 812, which is in communication with a first satellite 814. First satellite 814 is operable to transmit and receive signals from a second satellite 814, which is in communication with second VSAT modem 812. Second VSAT modem 812 is in communication with a financial service location 816 that includes multiple financial service provider elements 818. Financial service provider elements 818 are coupled to a main database 820. Again, the network configuration depicted in FIG. 8 is for example purposes only, and other configurations are within the scope of the present invention. An on-board back office 822 is preferably provided. The office may include any type of handheld device. In this example, a simple PC is docked on the boat. Note that such PCs are within the broad scope of the term "handheld device." Data is communicated by the on-board VSAT modem and transmitter to the first satellite for relay to the second (preferably land-based) VSAT receiver and modem. The data is then communicated to a server and/or centralized database via a mobile station controller (not shown). A similar scenario could involve such trading being executed on an airplane. Such an arrangement is clearly within the broad scope of the present invention.

In another example embodiment, the trading system may be used to enable financial activities involving multiple wireless users who interact with one another. For instance, the system may enable a trade in which a first user and a second user are conducting financial activity on the same transaction in which trades selected by the first user are executed by the second user. Preferably, the financial environment presented on the handheld devices of both the first and second users will indicate the existence and activity of the other respective user. In this sense, a broker can be used to proxy the request of the end user.

As described above, the elements and operations listed in FIGS. 1 through 8 may be achieved with use of financial system 10 in any number of contexts and applications. Accordingly, communications capabilities, data processing features and elements, suitable infrastructure, adequate personnel and management, and any other appropriate software, hardware, or data storage objects may be included within financial system 10 to effectuate the tasks and operations of the elements and activities associated with trading. Accordingly, FIG. 1 provides only one example of a suitable processing and communications platform from which end user 12 may execute trading.

Although the present invention has been described in detail with reference to particular embodiments in FIGS. 1-8, it should be understood that various other changes, substitutions, and alterations may be made hereto without departing from the sphere and scope of the present invention. For example, although the preceding FIGURES have referenced a number of asset structures that serve as a basis for trading, any suitable financial instruments, debts, securities, stocks, or commodities may be readily substituted for such assets and, similarly, benefit from the teachings of the present invention.

It is also important to note that the teachings of the present invention may be readily imparted to an end user (or a group of end users) such that the end user may sign up for (or enlist or enroll in) a charging plan that includes the operations and functions described herein. Thus, an end user could be enrolled in a charging plan that utilizes location-based verification methods in order to achieve appropriate trading authorization in a network environment. A corresponding bill may subsequently be generated that reflects such an arrangement. Such an arrangement may be reflected by a simple customer arrangement between a financial provider and a client. In a similar fashion, an end user could be enrolled in a financial policy plan, whereby similar subscribing occurs and billing ensues. The present invention is replete with such financial arrangements and readily encompasses all such possibilities.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims. In order to assist the United States Patent and Trademark Office (USPTO) and additionally any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of filing hereof unless the words "means for" or "step for" are specifically used in the particular claims; and (b) does not intend by any statement in the specification to limit his invention in any way that is not otherwise reflected in the appended claims.

What is claimed is:

1. An apparatus, comprising:
   at least one processor; and
   at least one memory device electronically coupled to the at least one processor, wherein the memory device stores instructions which, when executed by the at least one processor, direct the at least one processor to:
      determine that a location of a mobile device is within an approved trading area,
         wherein a user of the mobile device is permitted to execute trades of financial instruments via the mobile device when the mobile device is used by the user within approved trading areas,
         wherein the user is prohibited from executing trades of financial instruments via the mobile device when the mobile device is used by the user within unapproved trading areas, and
         wherein the apparatus is operable to communicate with the mobile device via a wireless communications network;
      receive from the user via the mobile device, while the location of the mobile device is within the approved trading area, a request to execute a trade of a financial instrument; and
   based at least in part on determining that the location of the mobile device is within the approved trading area, execute the trade of the financial instrument;
      subsequent to determining that the location of the mobile device is within the approved trading area, determine that a location of the mobile device is within an unapproved trading area;
      receive from the user via the mobile device, while the location of the mobile device is within the unapproved trading area, a request to execute another trade of the financial instrument; and
   based at least in part on determining that the location of the mobile device is within the unapproved trading area, not execute the another trade of the financial instrument.

2. The apparatus of claim 1, wherein the mobile device comprises at least one of: a personal data assistant, a laptop, a mobile station, a personal computer (PC), a mobile phone, a handheld device, and a table PC.

3. The apparatus of claim 1, wherein the approved trading area and the another approved trading area have different physical boundaries.

4. The apparatus of claim 1, wherein the instructions, when executed by the at least one processor, further direct the at least one processor to:

receive from the mobile device keystrokes entered by the user; and
record the keystrokes.

5. The apparatus of claim 1, wherein the instructions, when executed by the at least one processor, further direct the at least one processor to:
in response to a command from an administrator, send a kill message to the mobile device, wherein the kill message causes the mobile device to be disabled.

6. The apparatus of claim 5, wherein the kill message further causes the mobile device to remove at least a portion of data being stored on or displayed by the mobile device.

7. The apparatus of claim 1, wherein the instructions, when executed by the at least one processor, further direct the at least one processor to receive from the mobile device information related to the location of the mobile device; and wherein to determine that the location of the mobile device is within the approved trading area comprises to determine that the location of the mobile device is within the approved trading area based at least in part on the information received from the mobile device.

8. The apparatus of claim 7, wherein the information received from the mobile device is determined by the mobile device through a use of triangulation.

9. The apparatus of claim 7, wherein the information received from the mobile device comprises information indicative of at least one of:
a portion of the wireless communications network being accessed by the mobile device, and a component of the wireless communications network being accessed by the mobile device.

10. The apparatus of claim 1, wherein to determine that the location of the mobile device is within the approved trading area comprises to determine the location of the mobile device through a use of triangulation.

11. The apparatus of claim 10, wherein to determine that the location of the mobile device is within the approved trading area further comprises to determine the location of the mobile device through a use of a geographic map.

12. The apparatus of claim 1, wherein the at least one memory device is operable to store a profile associated with the user of the mobile device.

13. The apparatus of claim 12, wherein the profile includes at least one of: account information associated with the user, an asset position associated with the user, and personal identification information associated with the user.

14. The apparatus of claim 1, wherein the instructions, when executed by the at least one processor, further direct the at least one processor to:
receive from a financial exchange real-time pricing data related to the financial instrument; and
display the pricing data to the user via the mobile device.

15. The apparatus of claim 1, wherein the instructions, when executed by the at least one processor, further direct the at least one processor to:
based on at least one of:
a) an ID associated with the mobile device;
b) a system ID;
c) an application ID;
d) a tradedesk verification mechanism;
e) an ID associated with the user;
f) a picture ID associated with the user;
g) at least one biometric parameter associated with the user; and
h) a password associated with the user:
determine that the user is authorized to execute trades of financial instruments; and wherein to execute the trade of the financial instrument further comprises to execute the trade based at least in part on determining that the user is authorized to execute trades of financial instruments.

16. The apparatus of claim 1, wherein the financial instrument comprises at least one of:
a security, a fixed income security, a stock, a commodity, a derivative, and a futures contract.

17. The apparatus of claim 1, wherein the mobile device is operable to determine that the mobile device moved from within the approved trading area to within the unapproved trading area; and wherein to determine that the location of the mobile device is within the unapproved trading area comprises making the determination based on the mobile device determining that the mobile device moved from within the approved trading area to within the unapproved trading area.

18. The apparatus of claim 17, wherein the mobile device comprises a sensor operable to detect movement of the mobile device to a position external to the approved trading area, the position being within the unapproved trading area.

19. The apparatus of claim 18, wherein the sensor comprises a radio frequency identification sensor.

20. The apparatus of claim 17, wherein the mobile device is operable to use geo-fencing to determine that the mobile device moved from within the approved trading area to within the unapproved trading area.

21. The apparatus of claim 1, wherein the instructions, when executed by the at least one processor, further direct the at least one processor to:
prior to executing the trade of the financial instrument cause a voice connection to be established with the user via the mobile device in order to confirm an identity of the user and to confirm that the user made the request to execute the trade of the financial instrument.

22. The apparatus of claim 1, wherein to determine that the location of the mobile device is within the approved trading area comprises to receive from the mobile device an indication that the mobile device is within the approved trading area.

23. The apparatus of claim 1, wherein the instructions, when executed by the at least one processor, further direct the at least one processor to:
communicate trading information to the mobile device.

24. The apparatus of claim 23, wherein the instructions, when executed by the at least one processor, further direct the at least one processor to:
based at least in part on determining that the location of the mobile device is within the unapproved trading area, terminate communication of the trading information to the mobile device.

25. The apparatus of claim 24, wherein the mobile device is operable to determine that the mobile device moved from within the approved trading area to within the unapproved trading area; and wherein to determine that the location of the mobile device is within the unapproved trading area comprises making the determination based on the mobile device determining that the mobile device moved from within the approved trading area to within the unapproved trading area.

26. The apparatus of claim 25, wherein the mobile device comprises a radio frequency identification sensor operable to detect movement of the mobile device to a position external to the approved trading area, the position being within the unapproved trading area.

27. The apparatus of claim 25, wherein the mobile device is operable to use geo-fencing to determine that the mobile device moved from within the approved trading area to within the unapproved trading area.

28. The apparatus of claim 23, wherein the instructions, when executed by the at least one processor, further direct the at least one processor to:
  based at least in part on determining that the location of the mobile device is within the unapproved trading area, suspend communication of the trading information to the mobile device.

29. The apparatus of claim 28, wherein the instructions, when executed by the at least one processor, further direct the at least one processor to:
  subsequent to determining that the location of the mobile device is within the unapproved trading area, determine that a location of the mobile device is within another approved trading area; and
  based at least in part on determining that the location of the mobile device is within the another approved trading area, resume communication of the trading information to the mobile device.

30. The apparatus of claim 28, wherein the mobile device is operable to determine that the mobile device moved from within the approved trading area to within the unapproved trading area; and wherein to determine that the location of the mobile device is within the unapproved trading area comprises making the determination based on the mobile device determining that the mobile device moved from within the approved trading area to within the unapproved trading area.

31. The apparatus of claim 30, wherein the mobile device comprises a radio frequency identification sensor operable to detect movement of the mobile device to a position external to the approved trading area, the position being within the unapproved trading area.

32. The apparatus of claim 30, wherein the mobile device is operable to use geo-fencing to determine that the mobile device moved from within the approved trading area to within the unapproved trading area.

33. A method, comprising:
  determining, by at least one server, that a location of a mobile device is within an approved trading area,
    wherein a user of the mobile device is permitted to execute trades of financial instruments via the mobile device when the mobile device is used by the user within approved trading areas,
    wherein the user is prohibited from executing trades of financial instruments via the mobile device when the mobile device is used by the user within unapproved trading areas, and
    wherein the at least one server is communicating with the mobile device via a wireless communications network;
  receiving, by the at least one server, from the user via the mobile device, while the location of the mobile device is within the approved trading area, a request to execute a trade of a financial instrument;
  executing, by the at least one server, the trade of the financial instrument based at least in part on determining that the location of the mobile device is within the approved trading area;
  determining, by the at least one server, that a location of the mobile device is within an unapproved trading area subsequent to determining that the location of the mobile device is within the approved trading area;
  receiving, by the at least one server, from the user via the mobile device, while the location of the mobile device is within the unapproved trading area, a request to execute another trade of the financial instrument; and
  not executing, by the at least one server, the another trade of the financial instrument based at least in part on determining that the location of the mobile device is within the unapproved trading area.

34. The method of claim 33, further comprising:
  sending, by the at least one server, a kill message to the mobile device in response to a command from an administrator, wherein the kill message causes the mobile device to be disabled.

35. The method of claim 34, wherein the kill message further causes the mobile device to remove at least a portion of data being stored on or displayed by the mobile device.

36. The method of claim 33, wherein determining that the location of the mobile device is within the approved trading area comprises determining the location of the mobile device through a use of a geographic map.

37. The method of claim 33, further comprising:
  receiving, by the at least one server, from a financial exchange real-time pricing data related to the financial instrument; and
  displaying, by the at least one server, the pricing data to the user via the mobile device.

38. The method of claim 33, wherein the method further comprises:
  based on at least one of:
    a) an ID associated with the mobile device;
    b) a system ID;
    c) an application ID;
    d) a tradedesk verification mechanism;
    e) an ID associated with the user;
    f) a picture ID associated with the user;
    g) at least one biometric parameter associated with the user; and
    h) a password associated with the user:
  determining, by the at least one server, that the user is authorized to execute trades of financial instruments; and
  wherein executing the trade of the financial instrument further comprises executing the trade based at least in part on determining that the user is authorized to execute trades of financial instruments.

39. The method of claim 33, wherein the mobile device is operable to determine that the mobile device moved from within the approved trading area to within the unapproved trading area; and wherein determining that the location of the mobile device is within the unapproved trading area comprises making the determination based on the mobile device determining that the mobile device moved from within the approved trading area to within the unapproved trading area.

40. The method of claim 39, wherein the mobile device comprises a radio frequency identification sensor operable to detect movement of the mobile device to a position external to the approved trading area, the position being within the unapproved trading area.

41. The method of claim 33, further comprising:
  prior to executing the trade of the financial instrument, causing, by the at least one server, a voice connection to be established with the user via the mobile device in order to confirm an identity of the user and to confirm that the user made the request to execute the trade of the financial instrument.

42. The method of claim 33, wherein the method further comprises receiving, by the at least one server, from the mobile device information related to the location of the mobile device; and wherein determining that the location of the mobile device is within the approved trading area comprises determining that the location of the mobile device is within the approved trading area based at least in part on the information received from the mobile device.

43. The method of claim 42, wherein the information received from the mobile device is determined by the mobile device through a use of triangulation.

44. The method of claim 42, wherein the information received from the mobile device comprises information indicative of at least one of:
   a portion of the wireless communications network being accessed by the mobile device, and a component of the wireless communications network being accessed by the mobile device.

45. The method of claim 33, wherein determining that the location of the mobile device is within the approved trading area comprises receiving from the mobile device an indication that the mobile device is within the approved trading area.

46. The method of claim 33, further comprising communicating, by the at least one server, trading information to the mobile device.

47. The method of claim 46, further comprising:
   based at least in part on determining that the location of the mobile device is within the unapproved trading area, suspending, by the at least one server, communication of the trading information to the mobile device.

48. The method of claim 47, further comprising:
   subsequent to determining that the location of the mobile device is within the unapproved trading area, determining, by the at least one server, that a location of the mobile device is within another approved trading area; and
   based at least in part on determining that the location of the mobile device is within the another approved trading area, resuming, by the at least one server, communication of the trading information to the mobile device.

49. The method of claim 47, wherein the mobile device is operable to determine that the mobile device moved from within the approved trading area to within the unapproved trading area; and wherein determining that the location of the mobile device is within the unapproved trading area comprises making the determination based on the mobile device determining that the mobile device moved from within the approved trading area to within the unapproved trading area.

50. The method of claim 49, wherein the mobile device comprises a radio frequency identification sensor operable to detect movement of the mobile device to a position external to the approved trading area, the position being within the unapproved trading area.

51. The method of claim 46, further comprising:
   based at least in part on determining that the location of the mobile device is within the unapproved trading area, terminating, by the at least one server, communication of the trading information to the mobile device.

52. The method of claim 51, wherein the mobile device is operable to determine that the mobile device moved from within the approved trading area to within the unapproved trading area; and wherein determining that the location of the mobile device is within the unapproved trading area comprises making the determination based on the mobile device determining that the mobile device moved from within the approved trading area to within the unapproved trading area.

53. The method of claim 52, wherein the mobile device comprises a radio frequency identification sensor operable to detect movement of the mobile device to a position external to the approved trading area, the position being within the unapproved trading area.

54. The method of claim 33, further comprising:
   receiving, by the at least one server, from the mobile device keystrokes entered by the user at the mobile device; and
   recording, by the at least one server, the keystrokes.

55. A non-transitory computer readable medium comprising instructions which, when executed by at least one server, direct the at least one server to:
   determine that a location of a mobile device is within an approved trading area,
      wherein a user of the mobile device is permitted to execute trades of financial instruments via the mobile device when the mobile device is used by the user within approved trading areas,
      wherein the user is prohibited from executing trades of financial instruments via the mobile device when the mobile device is used by the user within unapproved trading areas, and
      wherein the at least one server is operable to communicate with the mobile device via a wireless communications network;
   receive from the user via the mobile device, while the location of the mobile device is within the approved trading area, a request to execute a trade of a financial instrument;
   execute the trade of the financial instrument based at least in part on determining that the location of the mobile device is within the approved trading area;
   determine that a location of the mobile device is within an unapproved trading area subsequent to determining that the location of the mobile device is within the approved trading area;
   receive from the user via the mobile device, while the location of the mobile device is within the unapproved trading area, a request to execute another trade of the financial instrument; and
   not execute the another trade of the financial instrument based at least in part on determining that the location of the mobile device is within the unapproved trading area.

56. The computer readable medium of claim 55, wherein the instructions, when executed by the at least one server, further direct the at least one server to:
   send a kill message to the mobile device in response to a command from an administrator, wherein the kill message causes the mobile device to be disabled.

57. The computer readable medium of claim 56, wherein the kill message further causes the mobile device to remove at least a portion of data being stored on or displayed by the mobile device.

58. The computer readable medium of claim 55, wherein to determine that the location of the mobile device is within the approved trading area comprises to determine the location of the mobile device through a use of a geographic map.

59. The computer readable medium of claim 55, wherein the instructions, when executed by the at least one server, further direct the at least one server to:
   receive from a financial exchange real-time pricing data related to the financial instrument; and
   display the pricing data to the user via the mobile device.

60. The computer readable medium of claim 55, wherein the instructions, when executed by the at least one server, further direct the at least one server to:
   based on at least one of:
      a) an ID associated with the mobile device;
      b) a system ID;
      c) an application ID;
      d) a tradedesk verification mechanism;
      e) an ID associated with the user;
      f) a picture ID associated with the user;
      g) at least one biometric parameter associated with the user; and h) a password associated with the user:
determine that the user is authorized to execute trades of financial instruments; and
wherein to execute the trade of the financial instrument further comprises to execute the trade based at least in part on determining that the user is authorized to execute trades of financial instruments.

61. The computer readable medium of claim 55, wherein the mobile device is operable to determine that the mobile device moved from within the approved trading area to within the unapproved trading area; and wherein to determine that the location of the mobile device is within the unapproved trading area comprises making the determination based on the mobile device determining that the mobile device moved from within the approved trading area to within the unapproved trading area.

62. The computer readable medium of claim 61, wherein the mobile device comprises a radio frequency identification sensor operable to detect movement of the mobile device to a position external to the approved trading area, the position being within the unapproved trading area.

63. The computer readable medium of claim 55, wherein the instructions, when executed by the at least one server, further direct the at least one server to:
prior to executing the trade of the financial instrument cause a voice connection to be established with the user via the mobile device in order to confirm an identity of the user and to confirm that the user made the request to execute the trade of the financial instrument.

64. The computer readable medium of claim 55, wherein the instructions, when executed by the at least one server, further direct the at least one server to receive from the mobile device information related to the location of the mobile device; and
wherein to determine that the location of the mobile device is within the approved trading area comprises to determine that the location of the mobile device is within the approved trading area based at least in part on the information received from the mobile device.

65. The computer readable medium of claim 64, wherein the information received from the mobile device is determined by the mobile device through a use of triangulation.

66. The computer readable medium of claim 64, wherein the information received from the mobile device comprises information indicative of at least one of:
a portion of the wireless communications network being accessed by the mobile device, and a component of the wireless communications network being accessed by the mobile device.

67. The computer readable medium of claim 55, wherein to determine that the location of the mobile device is within the approved trading area comprises to receive from the mobile device an indication that the mobile device is within the approved trading area.

68. The computer readable medium of claim 55, wherein the instructions, when executed by the at least one server, further direct the at least one server to communicate trading information to the mobile device.

69. The computer readable medium of claim 68, wherein the instructions, when executed by the at least one server, further direct the at least one server to:
based at least in part on determining that the location of the mobile device is within the unapproved trading area, suspend communication of the trading information to the mobile device.

70. The computer readable medium of claim 69, wherein the instructions, when executed by the at least one server, further direct the at least one server to:
subsequent to determining that the location of the mobile device is within the unapproved trading area, determine that a location of the mobile device is within another approved trading area; and
based at least in part on determining that the location of the mobile device is within the another approved trading area, resume communication of the trading information to the mobile device.

71. The computer readable medium of claim 69, wherein the mobile device is operable to determine that the mobile device moved from within the approved trading area to within the unapproved trading area; and wherein to determine that the location of the mobile device is within the unapproved trading area comprises making the determination based on the mobile device determining that the mobile device moved from within the approved trading area to within the unapproved trading area.

72. The computer readable medium of claim 71, wherein the mobile device comprises a radio frequency identification sensor operable to detect movement of the mobile device to a position external to the approved trading area, the position being within the unapproved trading area.

73. The computer readable medium of claim 68, wherein the instructions, when executed by the at least one server, further direct the at least one server to:
subsequent to determining that the location of the mobile device is within the approved trading area, determine that a location of the mobile device is within the unapproved trading area; and
based at least in part on determining that the location of the mobile device is within the unapproved trading area, terminate communication of the trading information to the mobile device.

74. The computer readable medium of claim 73, wherein the mobile device is operable to determine that the mobile device moved from within the approved trading area to within the unapproved trading area; and wherein to determine that the location of the mobile device is within the unapproved trading area comprises making the determination based on the mobile device determining that the mobile device moved from within the approved trading area to within the unapproved trading area.

75. The computer readable medium of claim 74, wherein the mobile device comprises a radio frequency identification sensor operable to detect movement of the mobile device to a position external to the approved trading area, the position being within the unapproved trading area.

76. The computer readable medium of claim 55, wherein the instructions, when executed by the at least one server, further direct the at least one server to:
receive from the mobile device keystrokes entered by the user at the mobile device; and
record the keystrokes.

* * * * *